(12) United States Patent
Ritter

(10) Patent No.: US 6,281,933 B1
(45) Date of Patent: Aug. 28, 2001

(54) IMAGES IN INTERLACED FORMATS: A NOVEL METHOD OF SCAN CONVERSION FOR VIDEO IMAGING SYSTEMS

(75) Inventor: David W. Ritter, San Jose, CA (US)

(73) Assignee: Chrontel, Inc., San Jose, CA (US)

( * ) Notice: Subject to any disclaimer, the term of this patent is extended or adjusted under 35 U.S.C. 154(b) by 0 days.

(21) Appl. No.: 08/988,790

(22) Filed: Dec. 11, 1997

(51) Int. Cl.⁷ .............................. H04N 7/01; H04N 11/20
(52) U.S. Cl. .................... 348/447; 348/446; 348/448; 348/910; 382/264
(58) Field of Search ................................ 348/446, 447, 348/448, 910; 382/264

(56) References Cited

U.S. PATENT DOCUMENTS

| | | | |
|---|---|---|---|
| 5,781,241 | * 7/1998 | Donovan | 348/441 |
| 5,790,205 | * 8/1998 | Pettit et al. | 348/629 |
| 5,815,208 | * 9/1998 | Samela et al. | 348/446 |
| 5,844,619 | * 12/1998 | Songer | 348/447 |
| 5,892,551 | * 4/1999 | Uematsu | 348/447 |
| 5,912,711 | * 6/1999 | Lin et al. | 348/446 |
| 5,963,262 | * 10/1999 | Ke et al. | 348/447 |
| 6,002,442 | * 12/1999 | Li et al. | 348/447 |
| 6,061,094 | * 5/2000 | Maietta | 348/446 |
| 6,084,568 | * 7/2000 | Premi et al. | 348/446 |
| 6,108,047 | * 8/2000 | Chen | 348/581 |
| 6,144,412 | * 11/2000 | Hirano et al. | 348/441 |
| 6,147,712 | * 11/2000 | Shimamoto et al. | 348/446 |

* cited by examiner

Primary Examiner—Reinhard J. Eisenzopf
Assistant Examiner—Brian P. Yenke
(74) Attorney, Agent, or Firm—Flehr Hohbach Test Albritton & Herbert LLP

(57) ABSTRACT

A two-dimensional (2D) filter is disclosed that accomplishes flicker filtering with virtually no loss of image resolution. The 2D filter operates without adaption and only on the non-detail portions of the original image. The filter works first in the horizontal (x-axis) direction by separating the high-pass (detail, high-resolution) image elements from the low-pass (blurred, low-resolution) elements. A vertical (y-axis) flicker filter is applied to the low-pass elements and the result is summed with the high-pass elements. Thus, the detail elements are not subjected to flicker filtering and, as a result, remain well-defined while flicker is eliminated from the overall image.

22 Claims, 7 Drawing Sheets

The 2D Flicker Filter

IMAGES IN INTERLACED FORMATS: A NOVEL METHOD OF SCAN CONVERSION FOR VIDEO IMAGING SYSTEMS

The present invention relates generally to scan rate conversion systems and, particularly, to scan rate conversion systems employing flicker filters to reduce the variations in interlaced images generated from progressive scan images.

BACKGROUND OF THE INVENTION

Generally, each frame of a video image is represented by a stream of pixel data corresponding to image values (analog, or digital with 1, 8, 16 or 24 bits per pixel) collected at defined positions along a plurality of horizontal scan lines. For example, a typical VGA computer image is represented by 640 8-bit pixels for each of 480 horizontal scan lines. There are two different ways in which the pixel data for a single video frame can be transmitted and displayed.

Referring to FIG. 1A, in a progressive scan display, such as a computer monitor, each line of a frame is displayed in order and the entire frame is displayed in a single field. Referring to FIG. 1B, in an interlace scan display, such as a television monitor, each frame is displayed in two fields. Each field consists of half the frame's lines and the lines of respective fields are interlaced. For example, the "odd" field consists of the odd lines L1, L3, L5, etc., and the "even" field consists of the even lines L2, L4, L6, etc. Interlace scan data is typical of NTSC, PAL and other television standards.

Presently, there are a number of products that employ a television-type (i.e., interlace scan) monitor to display progressive scan computer data. Examples include WebTV, which uses a television monitor to display Internet images, and various network computers and low cost computer systems that allow users to employ a television monitor as a computer display. This class of products is now described in reference to FIG. 2.

Referring to FIG. 2, there is shown a block diagram generally representative of prior art computer systems 140 that display progressive scan data 121 on an interlaced video display 190. Such a computer system 140 includes a processing unit 150, a memory 160 and a scan converter 180. The memory 160, which could be a fast random access memory or a slower hard disk drive, holds an operating system 162, application programs 164 and data 170. In the conventional manner, the processing unit 150 executes application programs 164 in the memory 160 under control of the operating system 162. Non-interlaced data 121 is stored temporarily in the memory 160 as video data 172, which is converted to the interlaced data 141 by the scan converter 180. Filter coefficients 174 used in the various filters employed in the scan converter 180 can also be stored in the memory 160.

The scan converter 180, which can be implemented in hardware or software, generates the interlaced stream 141 in accordance with the vertical and horizontal resolutions and scan rate of the interlaced video display 190. Typically, a scan converter 180 includes a flicker filter 182 to ameliorate image flicker, which is a problem that arises when images are converted from progressive scan to interlace scan. A scan converter 180 can also include a line memory 184 that provides fast, limited storage for the image data being processed by the scan rate converter 180 and the flicker filter 182. The problem solved by the flicker filter 182 is now described in reference to FIG. 3.

Referring to FIG. 3, there is shown one frame 122 of an original image represented by the non-interlaced stream 121, a closeup view 124a of that image, and representations 126a, 128a of the closeup 124a as it would appear on subsequent even and odd fields shown on the interlaced video display 190. Many of the details and horizontal edges of the original image 122 (e.g., the top and bottom lines of the "E" in the closeup 124a) lie along a single horizontal line. In interlaced video, such single-line details are scanned at only half the frame rate, causing annoying flickering on the display 190. For example, the top line of the "E" disappears in the odd field 126a and the bottom line disappears in the even field 128a. Image flicker results when the fields 126a, 128a are displayed sequentially, as they would be on the interlaced display 190.

In the prior art, single dimensional vertical filters (such as the [1, 2, 1] filter 182a of FIG. 2) are used to remove this flicker by blurring the offending detail over three frame lines instead of one. When properly executed, such filters completely remove the observable flickering, but at the cost of greatly reduced vertical image resolution.

Another class of filters tries to take advantage of the fact that, in general, flickering is only noticeable on larger elements of the image. For example, thin horizontal lines on the borders of large block characters or graphics flicker a great deal, but the cross element on a 't', or the dot on an 'i' doesn't seem to flicker at all. To take advantage of this effect, adaptive filters 182b (FIG. 2) have been designed that are enabled only when large elements exist on a single line and are otherwise disabled. Such adaptive filters have not been successful as they must switch between the two modes (enabled and disabled) at the pixel rate, resulting in worse artifacts than the flicker they were designed to reduce. Some types of prior art flicker filters are now described in greater detail.

The fundamental problem that causes flicker is the aliasing of an image along the vertical axis. Aliasing is caused when the sample rate of a data system is insufficient to represent the detail in the data. As stated by Nyquist: a wide sense stationary signal can be completely reproduced without error from a set of samples taken from that signal provided that the signal is strictly band-limited to a known frequency (say, FBW), and the spacing of the samples is uniform at a frequency of at least 2× FBW.

In a typical case of converting progressive scan images to interlace scan images, the original image 122 (FIG. 3) comprises 480 lines of video. In interlace format, this image is separated into two distinct fields 126a, 128a of 240 lines each (FIG. 3). Assuming that 480 vertical samples are sufficient to meet the Nyquist criteria for the source image, each field of only 240 samples would contain an alias error. If the two fields 126a, 128a were played back simultaneously, the errors would cancel but, in the interlace format, the fields are played back sequentially. Thus, a distortion in alternate fields results that is seen as flicker.

From a Nyquist perspective, the aliasing errors all exist in the upper half of the vertical frequency spectrum (i.e., aliasing errors occur only for high frequency details, which are details that can only be accurately represented with more than 240 samples). Thus, the prior art includes a class of vertical filters (generally known as half band filters) that are applied to the original picture to remove the upper half of the frequency spectrum and thereby filter out the offending elements and eliminate the flicker. Filters of this class that approximate the Nyquist requirement are very complex often having over 35 taps and large arrays of multipliers. Each tap of such a filter requires a full video line of storage to provide the requisite delay. Another problem is that the application of a Nyquist filter (sometimes called a "Brick Wall" filter) creates some serious distortions of its own, such as ringing and loss of detail. For example, small picture details and sharp edges will disappear along with the flicker. In view of these problems with Nyquist filters, another class of filters has been developed that implement a less stringent "Constant Luminance Principle."

In contrast to the Nyquist criteria, which is based on a mathematical ideal, the constant luminance principle (CLP) rests on perceptual effects. The CLP states: a sampled video signal will have the same overall luminance or intensity level as the original signal provided the original signal has zero content at the sample frequency, where "Overall Luminance" refers to the DC content of the signal. Thus, the CLP says that the DC content (i.e., the brightness or luminance in the signal) of the video signal remains the same so long as there is no content at the sampling rate prior to sampling. Variations in brightness are perceived as flicker. Thus, if an image is processed in accordance with CLP, an isolated detail in a picture will be reproduced without flicker (and at the same brightness as in the original image), even though it may be distorted in shape or slightly blurred.

As mentioned above, flicker is perceived in progressive scan images converted to interlace scan because the apparent intensity of a detail changes between the two fields of a frame. The class of filters designed in accordance with the CLP eliminate these intensity changes by applying a constant luminance filter to the original image data 121 (FIG. 1) before it is processed by the computer system 140. CLP filters don't guarantee that the shape of the detail is the same in both fields, but they do guarantee that the intensity is the same.

The simplest constant luminance filter is the [1, 1], simple, two point, moving average filter. It is rarely used because it is asymmetrical, and creates images with constant luminance, but with motion between fields on single line details. For best results the filter should be symmetrical. This is easily accomplished by convolving two [1, 1] filters to produce a symmetrical result, the well-known [1, 2, 1] filter, which is the simplest, symmetrical constant luminance FIR filter. Application of this filter to an image prior to scan conversion completely eliminates flicker at the cost of blurring of fine details.

Referring to FIG. 4, there is shown one frame 122 of an original image as represented by the non-interlaced stream 121, a closeup view 124b of that image after [1, 2, 1] filtering, and representations 126b, 128b of the closeup 124b as it would appear in subsequent fields on the interlaced video display 190. The [1, 2, 1] filter 182a generates each line F[i] of the filtered data 124b from the non-interlaced data (NI) 121 in accordance with the following equation:

$$F[i]=\frac{1}{4}(NI[i-1]+2NI[i]+NI[i]).$$

As a result, the top line of the "E", which is on an odd line, is represented on the even field 126b as symmetrical shadows of the original detail. Similarly, the bottom line of the "E", which is on an even line, is represented on the odd field 128b as symmetrical shadows of the original detail. Designers have also tried to modify the [1, 2, 1] filter to reduce its vertical blurring. Typical modifications include [1, 3, 1] and [2, 5, 2] filters. The improvements these filters introduce are incremental and are somewhat offset by a concomitant increase in flicker.

One of the primary concerns in scan conversion is the preservation of text readability in standard television images converted from computer display images. Since the traditional flicker filter necessarily blurs the image, text readability suffers. In an attempt to counter this effect, some manufacturers have used edge enhancing filters to make the text more readable. This attempt has not been successful largely because the filters operate in the horizontal direction, while the blurring distortion is introduced by flicker filters in the vertical direction. Moreover, adding an edge enhancing filter in the vertical direction simply undoes the action of the flicker filter.

Therefore, it is an object of the present invention to provide a scan conversion system that performs flicker filtering while enhancing the readability of text displayed on an interlaced display.

SUMMARY OF THE INVENTION

In summary, the present invention is a scan conversion system and method that converts standard, non-interlaced computer type images to interlaced broadcast type video images (compatible with the NTSC, Pal, CCIR601 standards, etc.) without loss of detail or text readability, in even the smallest applicable fonts, while reducing flicker.

The present invention first applies a horizontal low pass filter to a frame of input progressive scan image data to separate the high pass image elements from the low pass image elements. By definition, the low pass image elements are those elements that are likely to cause flicker in the interlace scan video image. The low pass image elements are subtracted from the input image data to produce a detail image and are also subjected to symmetric CLP flicker filtering in the vertical direction. The flicker-filtered image data are added to the detail image data and the resulting output forms interlace scan data that can be displayed on an interlaced display. The resulting image displayed from interlace scan data generated in accordance with the present invention is flicker-free and preserves fine vertical details, such as small text.

In the preferred embodiment, the horizontal low pass filter is a finite impulse response (FIR) digital filter. Before being combined with the low pass elements, the input image data is appropriately scaled and delayed to account for the gain and delay of the FIR filter. The CLP filter is preferably a [1, 2, 1] filter. Similarly, the detail image data is delayed and scaled before being combined with the flicker-filtered image data.

Alternatively, all of the filtering operations (i.e., horizontal low pass filtering, delay, scaling, vertical flicker filtering, addition and subtraction) are embodied in a two-dimensional (2D) filter kernel matrix The steps of the present invention are then performed in software or hardware as a set of matrix operations in which the 2D filter matrix is applied to an appropriate, time-varying set of the input image data.

In any configuration, the present invention achieves low flicker and fine details as the only parts of the image that are subjected to the blurring effects of flicker filtering are the low pass elements likely to cause flicker. Because the detail image is not flicker filtered, the fine details of the image are preserved.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

The present invention uses a two dimensional filter to accomplish flicker filtering with virtually no loss of image resolution. It operates without adaption and only on the non-detail portions of the original image. The filter works first in the horizontal (x-axis) direction by separating the high-pass (detail, high-resolution) image elements from the low-pass (blurred, low-resolution) elements. A vertical (y-axis) flicker filter is applied to the low-pass elements and the result is summed with the high-pass elements. Thus, the detail elements are not subjected to flicker filtering and, as a result, they remain crisp and well defined while flicker is eliminated from the overall image. The technique of the present invention is only slightly more complex than conventional one dimensional filters (e.g., the [1, 2, 1] filter), so it provides greatly improved images at very low cost, defining a new state of the art for interlaced video sources.

Figure 5:
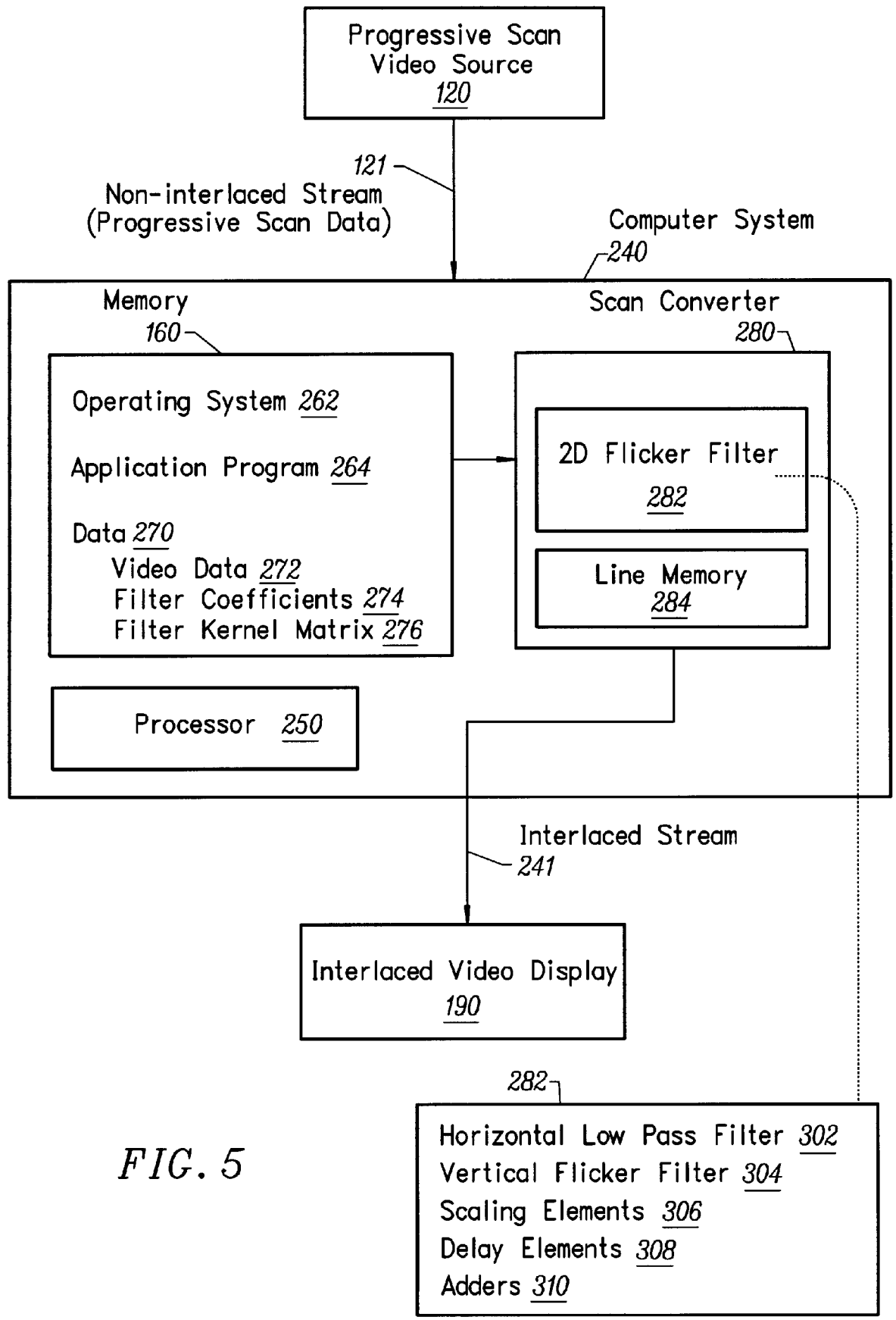
FIG. 5 is a block diagram of the scan conversion system and flicker filtering system of the present invention.

Referring to FIG. 5, there is shown a block diagram of the present invention. In the present invention a computer system 240 is employed to display progressive scan data 121 on an interlaced video display 190. Such a computer system 240 includes a processing unit 250, a memory 260 and a scan converter 280. The memory 260, which could be a fast random access memory or a slower hard disk drive, holds an operating system 262, application programs 264 and data 270. In the conventional manner, the processing unit 250 executes application programs 264 in the memory 260 under control of the operating system 262. Non-interlaced data 121 is stored temporarily in the memory 260 as video data 272, which is converted to interlaced data 241 by the scan converter 280. Also stored in the memory 260 are filter coefficients 274 and a filter kernel matrix 276 that, as described below, can be used to perform in a single matrix computation the operations of the flicker filter 282.

The scan converter 280, which can be implemented in hardware or software, generates the interlaced stream 241 in accordance with the vertical and horizontal resolutions and scan rate of the interlaced video display 190. The scan converter 280 includes a two dimensional (2D) flicker filter 282 designed in accordance with the present invention to ameliorate image flicker while preserving fine details in the image. The scan converter 280 can also include a line memory 284 that provides fast, limited storage for the image data being processed by the scan rate converter 280 and the flicker filter 282. Specific details of the 2D flicker filter are now described.

Referring to FIG. 5, the 2D flicker filter 282 includes a horizontal low pass filter 302; a vertical flicker filter 304; scaling and delay elements 306, 308; and adders 310. Preferably, the horizontal pass filter 302 is a finite impulse response (FIR) filter with between 5 and 21 taps. Such a wide range of taps is permissible as the performance of the present invention is relatively independent of the low pass filter 302 characteristics as long as the filter 302 has a cutoff that passes all low frequency image elements, which, for the purposes of the present invention, are defined to be the elements that cause image flicker. The weights are symmetrical about the filter's center point and, again, it is not particularly important how the weights are selected. In the preferred embodiment the FIR filter 302 has nine taps with the respective weights: [1, 2, 4, 6, 6, 6, 4, 2, 1]. The filter 302 characteristics will vary according to the characteristics and sampling rate of the source image. Note that the technique of the present invention is not dependent on using only a linear lowpass filter 302 but any process by which the detail elements of the image can be separated from the rest of the image. For example, a nine point median filter could be used in place of the horizontal lowpass filter 302.

As for the other elements of the filter 282, the vertical flicker filter 304, scaling and delay elements 306, 308 and adders 310 are implemented conventionally and can be replaced with any element in hardware or software capable of performing equivalent functions. The key benefits of the present invention arise from the integration of these elements, which is now described in reference to FIG. 6A.

Figure 6A:
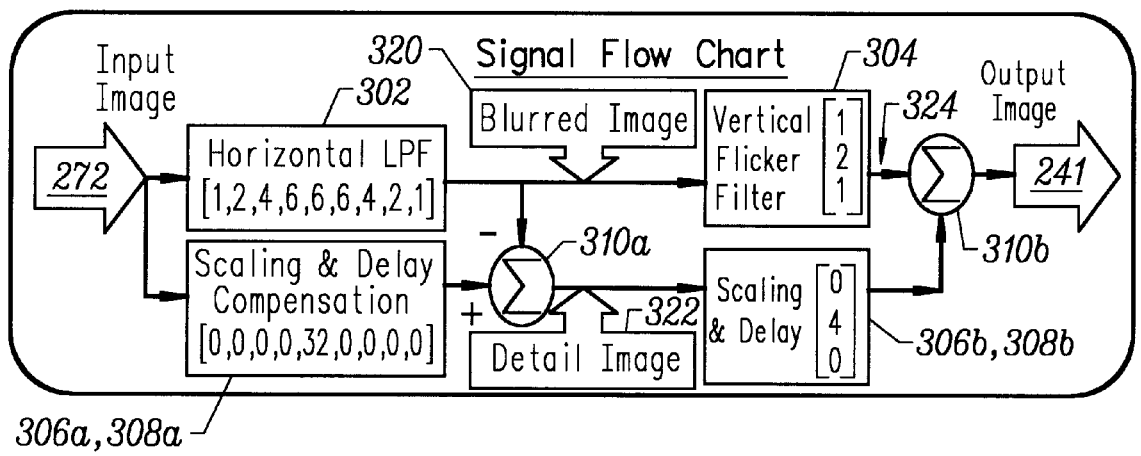
FIG. 6A depicts a signal flow chart of the preferred embodiment.

Referring to FIG. 6A, there is shown a signal flow chart illustrating the operation of the preferred embodiment, in which the low pass filter 302 is applied to the video data 272 (corresponding to one frame of the progressive scan data 121) to produce a low pass, or blurred image 320. The low pass image 320 is subsequently subtracted from the original image data 272 to create a high pass, or detailed image 304. Before the subtraction is performed by the adder 310a the original image data is first scaled and delayed to account for the delay and gain of the low pass filter 302. For example, the scaling and delay compensation 306a, 308a provides a delay of five samples (corresponding to the center point of the low pass filter 302) and a scale factor of 32 (corresponding to the gain of the filter 302). The result of the subtraction gives the detail image 322, which, by definition, is the original image 272 minus the low pass image data 320.

The blurred image 320 is input to the vertical [1, 2, 1] flicker filter 304 and the flicker-free image is output to the adder 310 to be combined with the scaled and delayed version of the detail image 322. The scaling and delay operations 306b, 308b are necessary to compensate for the delay (one sample) and gain (four) of the vertical flicker filter 304. The output of the adder 310b forms the interlaced stream 241, which is displayed on the interlaced video display 190. Because the detail image data 322 is not subjected to flicker filtering, the resulting image when displayed on the display will be flicker free and will include fine vertical details at resolutions unheard of with conventional flicker filtering techniques as performed in progressive to interlace scan conversion systems.

Figure 1A:
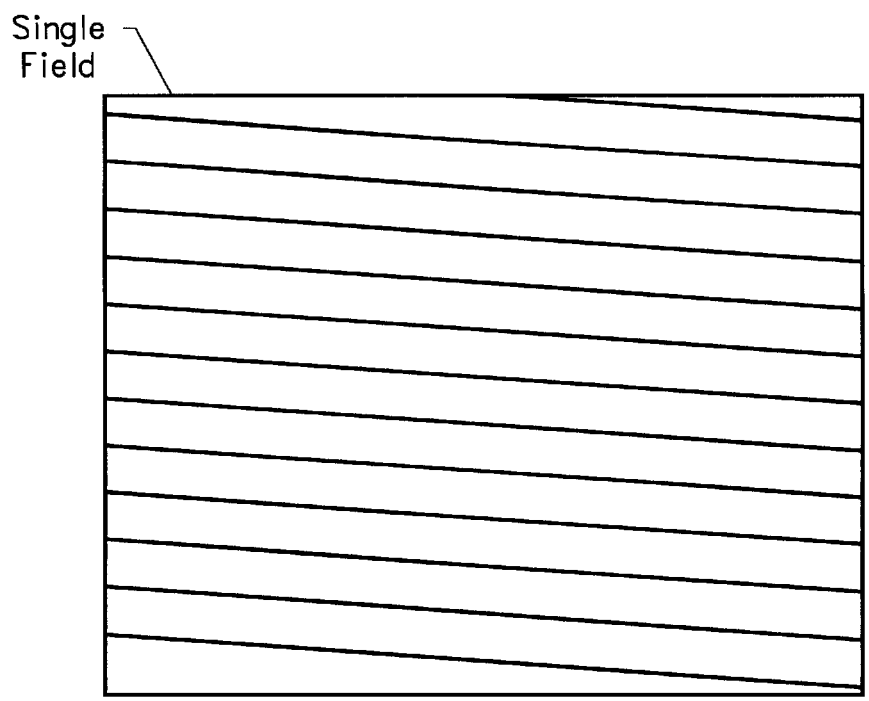
FIG. 1A is an illustration of a progressive scan video image.
Figure 1B:
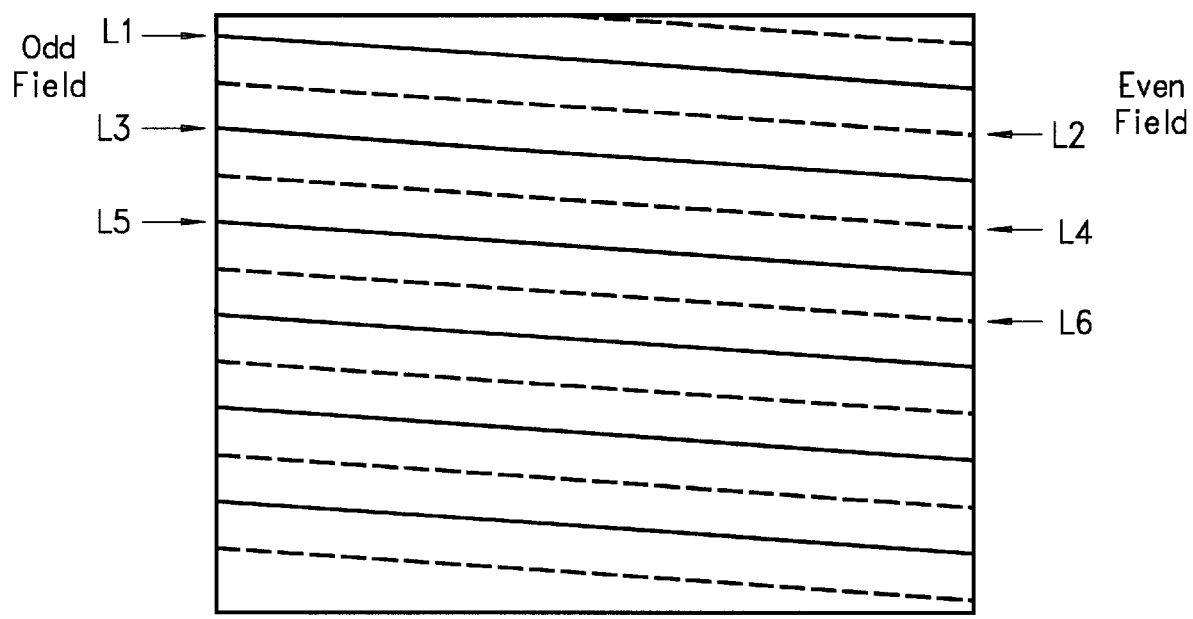
FIG. 1B is an illustration of a progressive scan video image.
Figure 2:
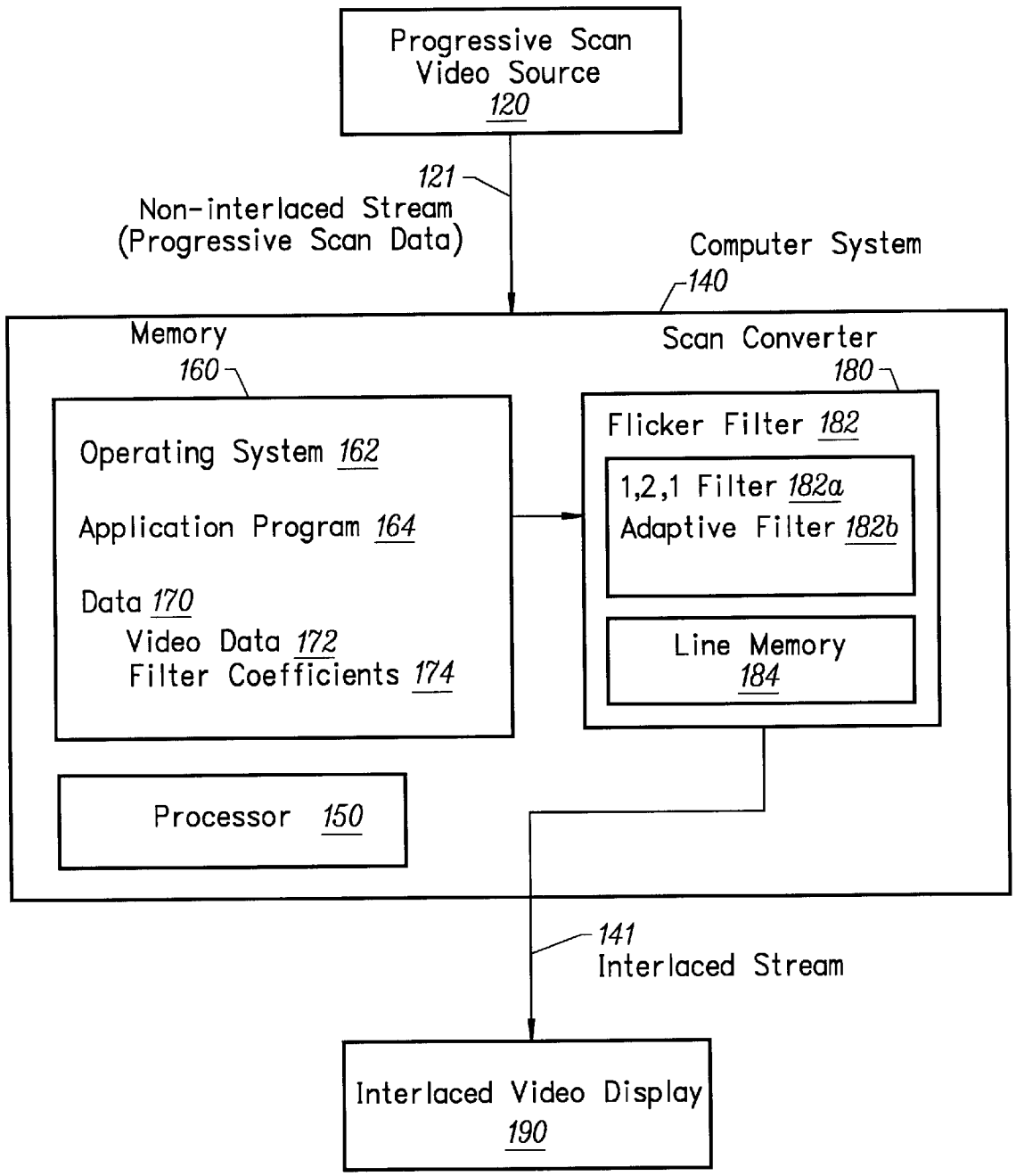
FIG. 2 is a block diagram of a prior art scan conversion and flicker filtering system.
Figure 3:
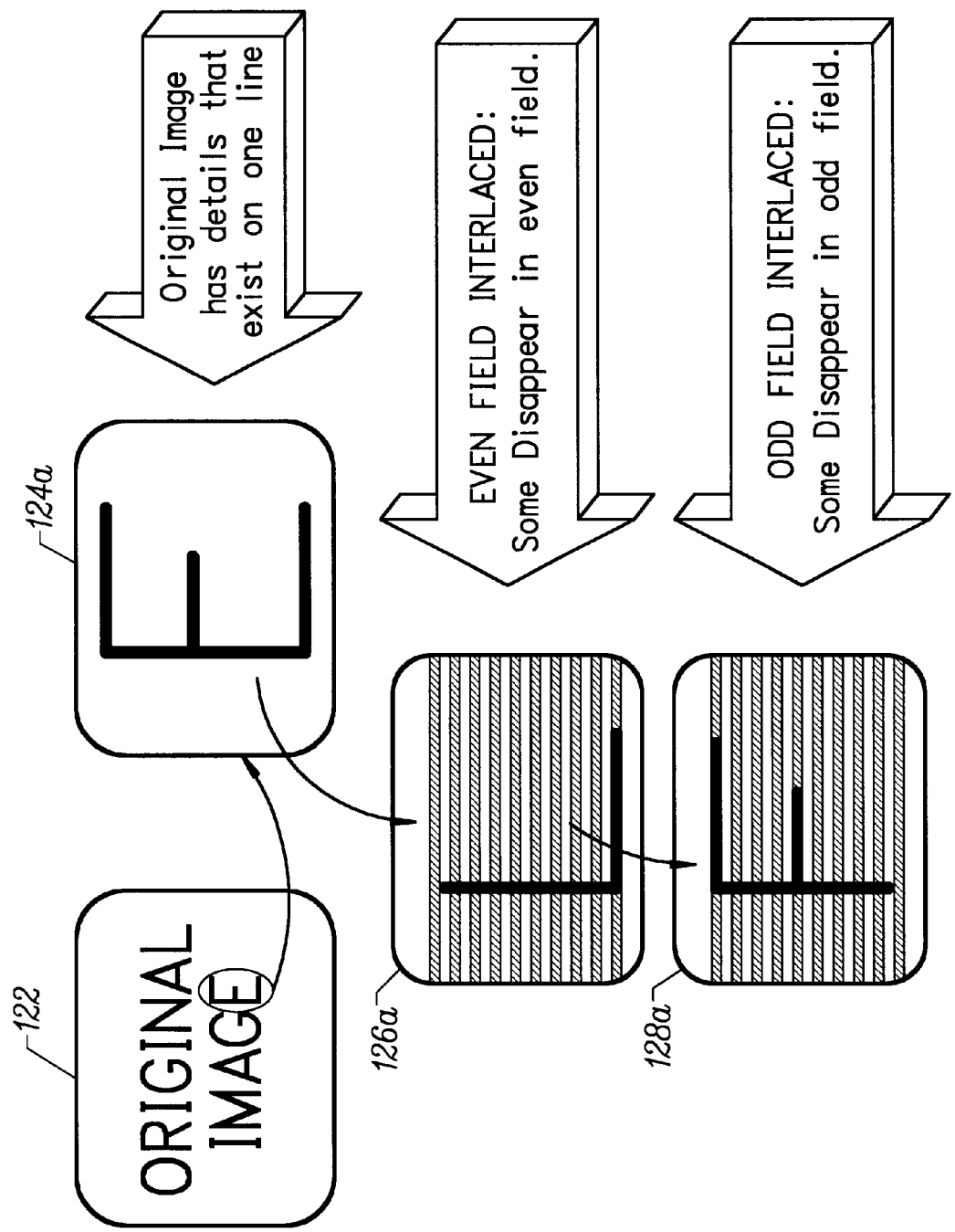
FIG. 3 depicts flicker artifacts produced by the prior art scan conversion systems without a flicker filtering system.
Figure 4:
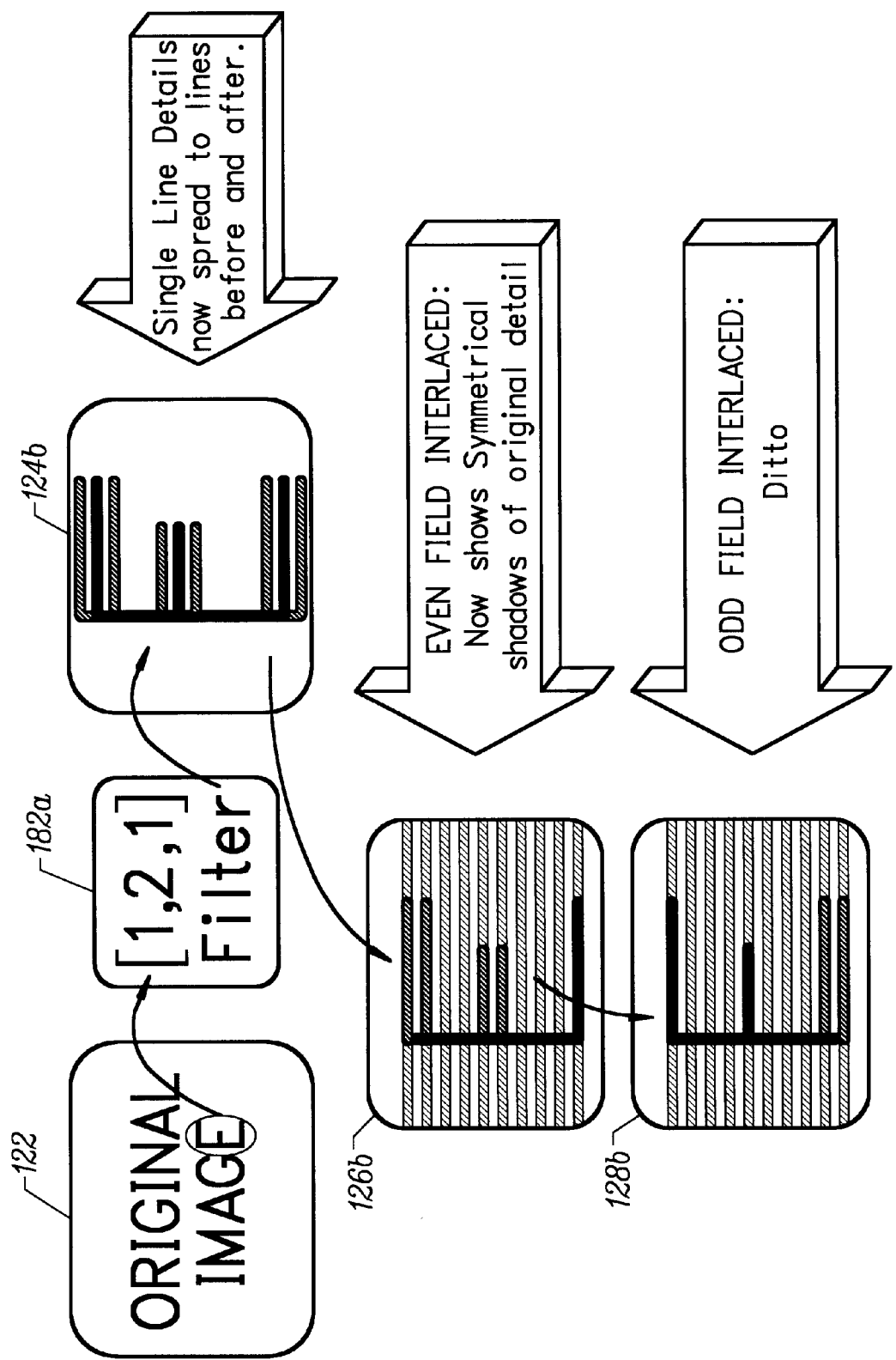
FIG. 4 depicts artifacts produced by the prior art scan conversion and flicker filtering system.
Figure 6B:
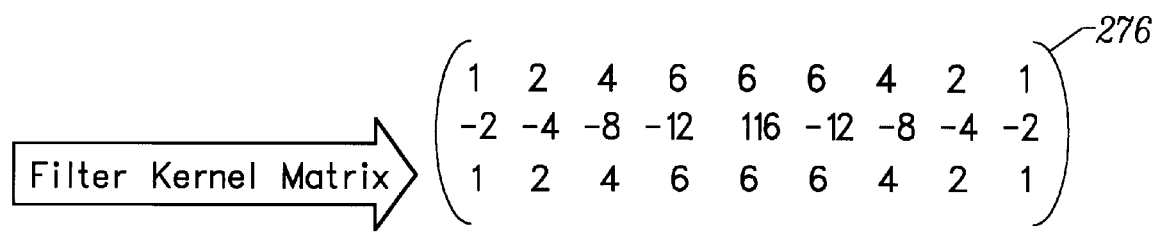
FIG. 6B depicts an equivalent filter kernel implementation of the present invention and FIG. 6C depicts an illustrative interlace scan image obtained using the present invention.
Figure 6C:
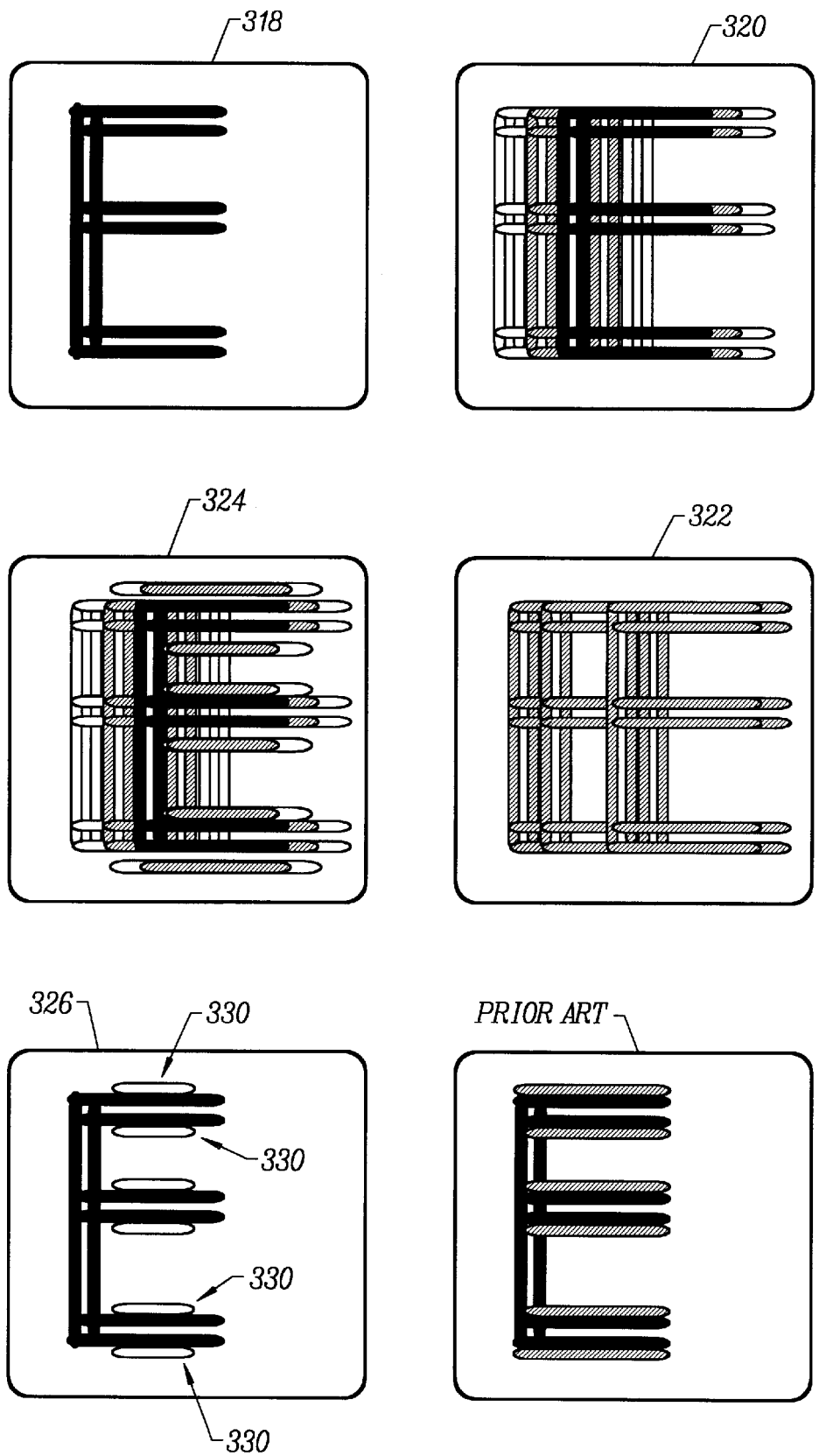

Referring to FIG. 6C, there is shown a portion of an original image 318 represented by the video data 272 and the corresponding low pass image 320, detail image 322, vertical flicker-filtered image 324 and final output 326 produced by the present invention. As in the discussions of FIGS. 3 and 4, the original image 318 includes features (such as the horizontal members of the "E") no wider than a single horizontal line. The low pass-filtered image 320 is called the blurred image because the low pass filter 302 spreads the details of the original image 122 in the horizontal direction.

When the blurred image 320 is subtracted from the original image 318, a detail image 322 results in which the blurred elements have been subtracted away and the high pass elements remain. The flicker filtered image 324 shows how the flicker filter 304 spreads the details of the blurred image in the vertical direction so that those elements will be distributed across multiple horizontal lines in the interlace scan image 241. As discussed in the background, this vertical spreading is desired in the elements that cause flicker but is not desired in fine details, which do not cause appreciable flicker.

After the detail image 322 is subtracted from the flicker-filtered, low pass image 324 the resulting output 326, corresponding to the interlaced data 241 (FIG. 6A), includes a sharp version of the original image, albeit with some minor artifacts 330 that are vertical shadows of some of the horizontal elements. These shadows occur only at the center of the larger horizontal, single line elements. This is contrasted with the prior art where such shadows occur along the entire length of all horizontal elements. Whereas the larger artifacts in the prior art create a blurred effect, perceptual tests show that the shorter and fainter artifacts of the new approach do not appreciably degrade the sharpness of the details 124 as displayed on the interlaced video display 190. This is because the artifacts are of much lower intensity than the original detail, which is still present. In contrast, as described in reference to FIG. 4, when a [1, 2, 1] flicker filter is applied to all image elements, single-line elements are often replaced by symmetrical shadows on the horizontal lines above and below the position of the original single-line element, which blurs fine details.

In summary, whereas a traditional flicker filter performs vertical filtering on all elements of the image, the method of the present invention separates those elements of the image that cause flicker from those that don't. Elements that cause flickering are passed through the flicker filter and then recombined with the detail elements at the output. The result is an image without flicker, but also with high vertical resolution.

Referring to FIG. 6B, there is shown a two dimensional (2D) filter kernel matrix 340 that embodies the filter, delay, scaling and addition operations performed by the preferred embodiment of FIG. 6A The filter matrix 340 is derived by treating the operations of FIG. 6A as matrix and vector operations, the result being the filter matrix 340. For example, the effect of applying the vertical flicker filter subsequent to the horizonal low pass filtering step is represented by forming the 3×9 outer product of the vertical flicker filter 304 weight vector [1, 2, 1] and the horizontal low pass filter 302 weight vector [1, 2, 4, 6, 6, 6, 4, 2, 1]. The resulting 2D matrix 340 can be applied to the input stream 276 in software or hardware.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A two-dimensional scan conversion system that eliminates flicker from an interlace scan image formed from progressive scan input data while preserving high vertical resolution in the interlace scan image, comprising:
   a separation filter configured to generate a blurred image from the input data, the blurred image including the elements of the input data likely to cause flicker in the interlace scan image;
   a vertical flicker filter configured to generate a flicker-filtered image from the blurred image; and
   an adder configured to:
      output a detail image by subtracting the blurred image data from the input data, and
      add the flicker-filtered image data and the detail image data to generate the interlace scan image data,
   the resulting interlace scan image having high vertical resolution because the detail image data is not flicker-filtered and imperceptible flicker because the blurred image data is flicker-filtered.

2. The two-dimensional scan conversion system of claim 1, wherein the separation filter comprises a horizontal low pass filter.

3. The two-dimensional scan conversion system of claim 2, wherein the horizontal low pass filter comprises a FIR filter.

4. The two-dimensional scan conversion system of claim 3, wherein the vertical flicker filter comprises a [1, 2, 1] flicker filter.

5. The two-dimensional scan conversion system of claim 3, wherein the separation filter, adder and vertical flicker filter operations are implemented by applying a corresponding filter kernel matrix to the input data.

6. The two-dimensional scan conversion system of claim 5, wherein the adder comprises a first adder, which generates the detail image data, and a second adder, which generates the interlace scan image data.

7. The two-dimensional scan conversion system of claim 6, wherein the input data coupled to the first adder comprises compensated input data and the detail image data coupled to the second adder comprises compensated detail image data, further comprising:
   a first scaling and delay compensator configured to generate the compensated input data from the input data in accordance with the delay and gain associated with the horizontal low pass filter; and
   a second scaling and delay compensator configured to generate the compensated detail image data from the detail image data in accordance with the delay and gain associated with the vertical flicker filter.

8. A two-dimensional scan conversion method that eliminates flicker from an interlace scan image formed from progressive scan input data while preserving high vertical resolution in the interlace scan image, comprising the steps of:
   separating low pass elements in the input data from high pass elements in the image data, wherein the low pass image data comprises elements of the input data likely to cause flicker in the interlace scan image;
   flicker-filtering the low pass elements; and
   generating the interlace scan image data by combining the high pass elements with the flicker-filtered low pass elements, the resulting interlace scan image having high vertical resolution because the high pass elements are not flicker-filtered and imperceptible flicker because the low pass elements are flicker-filtered.

9. The two-dimensional scan conversion method of claim 8, wherein the separating step comprises the step of:
   low pass filtering the input data in the horizontal direction.

10. The two-dimensional scan conversion method of claim 8, wherein the flicker removing step comprises the step of: applying a [1, 2, 1] flicker filter to the low pass elements in the vertical direction.

11. The two-dimensional scan conversion method of claim 8, wherein the combining step comprises the steps of:
   generating a detail image by subtracting the low pass data from the input data; and
   generating the interlaced scan image by adding the flicker-filtered low pass elements and the detail image data.

12. The two-dimensional scan conversion system of claim 11, wherein the input data employed in the first combining step comprises compensated input data and the detail image data employed in the second combining step comprises compensated detail image data, further comprising the steps of:
   generating the compensated input data by scaling and delaying the input data in accordance with the delay and gain associated with the horizontal low pass filter; and
   generating the compensated detail image data by scaling and delaying the detail image data in accordance with the delay and gain associated with the vertical flicker filter.

13. A two-dimensional scan conversion system that eliminates flicker from an interlace scan image formed from progressive scan input data while preserving high vertical resolution in the interlace scan image, comprising:
   a separation filter that low pass filters said input data in a horizontal direction to generate a blurred image from said input data, said blurred image including elements of said input data likely to cause flicker in said interlace scan image;
   a vertical flicker filter configured to generate a flicker-filtered image from said blurred image; and
   an adder configured to output a detail image by subtracting blurred image data from said input data, and configured to add flicker-filtered image data and detail image data to generate interlace scan image data;
   wherein a resulting interlace scan image exhibits high vertical resolution and imperceptible flicker.

14. The two-dimensional scan conversion system of claim 13, wherein said separation filter comprises a FIR filter.

15. The two-dimensional scan conversion system of claim 13, wherein said vertical flicker filter comprises a [1, 2, 1] flicker filter.

16. The two-dimensional scan conversion system of claim 13, wherein said separation filter, adder and vertical flicker filter operations are implemented by applying a corresponding filter kernel matrix to said input data.

17. The two-dimensional scan conversion system of claim 13, wherein said adder comprises a first adder that generates said detail image data, and a second adder that generates said interlace scan image data.

18. The two-dimensional scan conversion system of claim 17, wherein input data coupled to said first adder comprises compensated input data and detail image data coupled to said second adder comprises compensated detail image data, further comprising:
   a first scaling and delay compensator configured to generate compensated input data from said input data according to delay and gain associated with said separation filter; and
   second scaling and delay compensator configured to generate compensated detail image data from detail image data according to delay and gain associated with said vertical flicker filter.

19. A two-dimensional scan conversion method that eliminates flicker from an interlace scan image formed from progressive scan input data while preserving high vertical resolution in the interlace scan image, the method comprising the following steps:
   (a) low pass filtering said input data in a horizontal direction so as to separate low pass elements therein from high pass elements in image data, wherein low pass image data comprises input data elements likely to cause flicker in said interlace scan image;
   (b) flicker-filtering said low pass elements; and
   (c) combining said high pass elements with flicker-filtered low pass elements to generate said interlace scan image data;
   wherein a resultant interlace scan image has high vertical resolution and imperceptible flicker.

20. The two-dimensional scan conversion method of claim 19, wherein step (b) comprises applying a [1, 2, 1] flicker filter to said low pass elements in a vertical direction.

21. The two-dimensional scan conversion method of claim 19, wherein step (c) comprises:
   (c-1) generating a detail image by subtracting low pass data from said input data; and
   (c-2) generating said interlaced scan image by adding flicker-filtered low pass elements.

22. The two-dimensional scan conversion system of claim 21, wherein data employed at step (c-1) comprises compensated input data, and detail image data employed at step (c-2) comprises compensated detail image data,
   the method further comprising the steps of:
   generating compensated input data by scaling and delaying said input data according to delay and gain associated with low pass filtering at step (a); and
   generating compensated detail image data by scaling and delaying detail image data in accordance according to delay and gain associated with vertical flicker filtering at step (c).

* * * * *